(12) United States Patent
Shen et al.

(10) Patent No.: US 12,075,420 B2
(45) Date of Patent: Aug. 27, 2024

(54) METHOD FOR TRANSMITTING UPLINK CONTROL INFORMATION, TERMINAL DEVICE, AND NETWORK DEVICE

(71) Applicant: VIVO MOBILE COMMUNICATION CO., LTD., Guangdong (CN)

(72) Inventors: Xiaodong Shen, Guangdong (CN); Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 351 days.

(21) Appl. No.: 17/700,677

(22) Filed: Mar. 22, 2022

(65) Prior Publication Data

US 2022/0217716 A1    Jul. 7, 2022

Related U.S. Application Data (63) Continuation of application No. PCT/CN2020/116916, filed on Sep. 22, 2020.

(30) Foreign Application Priority Data

Sep. 27, 2019   (CN) .......................... 201910927170.7

(51) Int. Cl.
   *H04W 72/21*   (2023.01)
(52) U.S. Cl.
   CPC .................................. *H04W 72/21* (2023.01)
(58) Field of Classification Search
   CPC .... H04W 72/21; H04L 1/0013; H04L 1/0041; H04L 1/0072; H04L 5/0053; H04L 5/0055; H04L 5/0058; H04L 1/0008; H04L 1/1864; H04L 1/1893; H04L 5/0092; H04L 1/1812; H04L 1/1854
   See application file for complete search history.

(56) References Cited

U.S. PATENT DOCUMENTS

| | | | |
|---|---|---|---|
| 10,523,397 B2 | 12/2019 | Park et al. | |
| 11,212,823 B2 | 12/2021 | Zheng et al. | |
| 2011/0268075 A1 | 11/2011 | Heo et al. | |
| 2011/0310986 A1 | 12/2011 | Heo et al. | |
| 2018/0167931 A1* | 6/2018 | Papasakellariou | .... H04L 1/1861 |
| 2019/0199477 A1* | 6/2019 | Park | ...................... H04L 1/0026 |
| 2019/0223205 A1 | 7/2019 | Papasakellariou | |
| 2020/0274637 A1 | 8/2020 | Li et al. | |
| 2020/0366449 A1 | 11/2020 | Li et al. | |

(Continued)

FOREIGN PATENT DOCUMENTS

| | | |
|---|---|---|
| CN | 102282819 A | 12/2011 |
| CN | 103168441 A | 6/2013 |

(Continued)

OTHER PUBLICATIONS

Feature lead summary on configured grant enhancement, 3GPP TSG RAN WG1 #98, Aug. 26-30, 2019, R1-1909476, vivo, Prague, CZ.

(Continued)

*Primary Examiner* — Hashim S Bhatti
(74) *Attorney, Agent, or Firm* — IP & T GROUP LLP (57) ABSTRACT

A method for transmitting uplink control information includes: multiplexing independently coded UCI onto a PUSCH according to a target size to send the independently coded UCI, where the target size is determined according to an actual size of the independently coded UCI.

20 Claims, 5 Drawing Sheets

(56) References Cited

U.S. PATENT DOCUMENTS

2021/0045143 A1 2/2021 Ji et al.
2021/0092735 A1 3/2021 Wang et al.
2021/0092756 A1* 3/2021 Takeda .................. H04L 5/0044

FOREIGN PATENT DOCUMENTS

| CN | 107210889 A | 9/2017 |
| CN | 109076569 A | 12/2018 |
| CN | 109802813 A | 5/2019 |
| CN | 110061805 A | 7/2019 |
| CN | 110167157 A | 8/2019 |
| WO | 2019004881 A1 | 1/2019 |
| WO | 2019/134083 A1 | 7/2019 |
| WO | 2019/154356 A1 | 8/2019 |

OTHER PUBLICATIONS

The First Office Action of Priority Application No. CN 201910927170.7 issued by the Chinese Patent Office on Aug. 27, 2021.

The Second Office Action of Priority Application No. CN 201910927170.7 issued by the Chinese Patent Office on Mar. 1, 2022.

International Search Report and Written Opinion of International Application No. PCT/CN2020/116916 issued by the Chinese Patent Office on Dec. 14, 2020.

LG Electronics, Text Proposals on PUSCH UCI Multiplexing, 3GPP TSG RAN WG1Adhoc_NR_AH_1801 R1-1800377, 3GPP, Jan. 13, 2018.

Samsung, Corrections on UCI Multiplexing in PUSCH, 3GPP TSG RAN WG1Adhoc_NR_AH_1801 R1-1800449. 3GPP, Jan. 13, 2018.

Sharp, Remaining Issues on PUCCH, 3GPP TSG RAN WG1#94B R1-1811143, 3GPP, Sep. 28, 2018.

Qualcomm Incorporated and Intra-UE prioritization: Role of PHY in prioritization, 3GPP TSG RAN WG2#106 R2-1907921, 3GPP, May 3, 2019.

Notice of Reasons for Refusal issued by the JPO for Japanese Patent Application No. 2022-518886, dated Apr. 26, 2023.

Office Action issued by the Indian Patent Office for Application No. 202247023103, dated Aug. 24, 2022.

EESR issued by the EPO for EP 20867678.3, dated Oct. 20, 2022.

3GPP, NR; Multiplexing and channel coding (Release 15), TS 38.212 V15.7.0, Sep. 25, 2019, pp. 1-101, 3GPP.

OPPO, R1-1909492, Summary of email discussion [97-NR-05] on handling intra-UE collision scenarios for URLLC UCI enhancements, 3GPP TSG RAN WG1 #98, Aug. 26-30, 2019, 3GPP.

Office Action for Korean Patent Application No. 10-2022-7014012 issued by the Korean Patent Office on Jun. 27, 2024.

* cited by examiner

METHOD FOR TRANSMITTING UPLINK CONTROL INFORMATION, TERMINAL DEVICE, AND NETWORK DEVICE

CROSS-REFERENCE OF RELATED APPLICATIONS

This application is a Bypass Continuation Application of PCT/CN2020/116916 filed on Sep. 22, 2020, which claims priority to Chinese Patent Application No. 201910927170.7 filed on Sep. 27, 2019, which are incorporated herein by reference in their entirety.

TECHNICAL FIELD

Embodiments of the present disclosure relate to the field of communications technologies, and in particular to a method for transmitting uplink control information, a terminal device, and a network device.

BACKGROUND

In an unlicensed band of new radio (NR), a terminal or network device needs to perform, before sending information, clear channel assessment (CCA)/extended clear channel assessment (eCCA) to monitor a channel, that is, to perform energy detection (ED). When energy is lower than a certain threshold, the channel is determined to be idle, and then transmission may be started, that is, listen before talk (LBT). Because the unlicensed band is shared by a plurality of technologies or transmission nodes, such contention-based access mode leads to uncertainty of channel available time. When the channel is available, a transmissible position for signal transmission on a network side may have been missed and a signal cannot be transmitted. As a result, a receive end may be unable to receive the signal configured on the network side normally, or perform terminal behaviors, such as physical downlink control channel (PDCCH) monitoring, wireless environment monitoring and measurement, and the like, according to the configuration of the network side after receiving signal. A process of determining whether the channel is idle through the CCA and of transmission may be called a channel access process.

SUMMARY

According to a first aspect, an embodiment of the present disclosure provides a method for transmitting uplink control information, where the method is performed by a terminal device and includes: multiplexing independently coded uplink control information UCI onto a physical uplink shared channel PUSCH according to a target size to send the independently coded UCI, where the target size is determined according to an actual size of the independently coded UCI.

According to a second aspect, an embodiment of the present disclosure provides a method for transmitting uplink control information, where the method is performed by a terminal device and includes: multiplexing independently coded uplink control information UCI onto a physical uplink shared channel PUSCH to send the independently coded UCI, where in the case that the number of pieces of the independently coded UCI is greater than a preset threshold value, the independently coded UCI is merged, so that the number of the pieces of the independently coded UCI after merging is less than or equal to the preset threshold value.

According to a third aspect, an embodiment of the present disclosure provides a method for transmitting uplink control information, where the method is performed by a network device and includes: receiving independently coded uplink control information UCI, where the UCI is sent by multiplexing the independently coded UCI onto a physical uplink shared channel PUSCH according to a target size, and the target size is determined according to an actual size of the independently coded UCI.

According to a fourth aspect, an embodiment of the present disclosure provides a terminal device, including: a sending module, configured to multiplex independently coded uplink control information UCI onto a physical uplink shared channel PUSCH according to a target size to send the independently coded UCI, where the target size is determined according to an actual size of the independently coded UCI.

According to a fifth aspect, an embodiment of the present disclosure provides a terminal device, including: a transmitting module, configured to multiplex independently coded uplink control information UCI onto a physical uplink shared channel PUSCH to send the independently coded UCI, where in the case that the number of pieces of the independently coded UCI is greater than a preset threshold value, the independently coded UCI is merged, so that the number of the pieces of the independently coded UCI after merging is less than or equal to the preset threshold value.

According to a sixth aspect, an embodiment of the present disclosure provides a network device, including: a receiving module, configured to receive independently coded uplink control information UCI, where the UCI is sent by multiplexing the independently coded UCI onto a physical uplink shared channel PUSCH according to a target size, and the target size is determined according to an actual size of the independently coded UCI.

According to a seventh aspect, an embodiment of the present disclosure provides a terminal device, including: a processor, a memory, and a computer program stored in the memory and executable on the processor, where when the computer program is executed by the processor, the steps of the method for transmitting uplink control information according to the first aspect or the second aspect are implemented.

According to an eighth aspect, an embodiment of the present disclosure provides a network device, including: a processor, a memory, and a computer program stored in the memory and executable on the processor, where when the computer program is executed by the processor, the steps of the method for transmitting uplink control information according to the third aspect are implemented.

According to a ninth aspect, an embodiment of the present disclosure provides a non-transitory computer-readable storage medium, where the non-transitory computer-readable storage medium stores a computer program, and when the computer program is executed by a processor, the steps of the method for transmitting uplink control information according to the first aspect, the second aspect, or the third aspect are implemented.

BRIEF DESCRIPTION OF DRAWINGS

The accompanying drawings described herein are used to provide understanding of the present disclosure and constitute a part of the present disclosure. The illustrative embodiments of the present disclosure and descriptions thereof are used to explain the present disclosure, and do not constitute an improper limitation to the present disclosure.

DESCRIPTION OF EMBODIMENTS

To make the objectives, technical solutions, and advantages of the present disclosure clearer, the following clearly describes the technical solutions of the present disclosure with reference to embodiments of the present disclosure and the accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure. The term "and/or" in the embodiments of the specification indicates at least one of a former one or a latter one.

It should be understood that the technical solutions in the embodiments of the present disclosure may be applied to various communication systems, such as a long term evolution (LTE) system, a LTE frequency division duplex (FDD) system, LTE time division duplex (TDD), a universal mobile telecommunications system (UMTS), or a worldwide interoperability for microwave access (WiMAX) communications system, a 5G system, or a new radio (NR) system, or a subsequent evolution communication system.

In the embodiments of the present disclosure, a terminal device may include, but is not limited to a mobile station (MS), a mobile terminal, a mobile telephone, user equipment (UE), a handset, portable equipment, a vehicle, and the like. The terminal device may communicate with one or more core networks by using a radio access network (RAN). For example, the terminal device may be a mobile telephone (or referred to as a "cellular" telephone), or a computer having a wireless communication function; or the terminal device may be a portable, pocket-sized, handheld, computer built-in, or vehicle-mounted mobile device.

In the embodiments of the present disclosure, a network device is an apparatus that is deployed in a radio access network and that is used to provide a wireless communication function for a terminal device. The network device may be a base station, and the base station may include various types of macro base stations, micro base stations, relay stations, or access points. In systems that use different radio access technologies, devices that have a base station function may have different names. Therefore, the network device should be broadly interpreted herein, and its examples include, but are not limited to, an evolved NodeB (eNB, or eNodeB) in a LTE network, a NodeB in a third generation (3G) network, a network device in a subsequent evolved communications system, or the like. However, the terms do not constitute a limitation.

Usually, when a physical uplink control channel (PUCCH) for transmitting uplink control information (UCI) and a physical uplink shared channel (PUSCH) overlap in time, the UCI needs to be multiplexed on the PUSCH for transmission. However, a size of the UCI may be inconsistent between a base station and user equipment (UE), which will lead to a decoding failure of the PUSCH.

Figure 1:
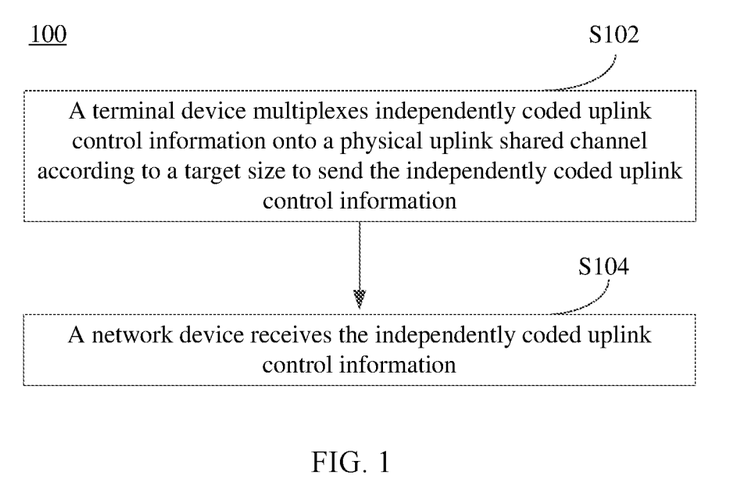
FIG. 1 is a schematic flow chart of an information transmission process including a method for transmitting uplink control information according to a first aspect and a third aspect of the present disclosure.

FIG. 1 is a schematic flow chart of an information transmission process including a method for transmitting uplink control information according to a first aspect and a third aspect of the present disclosure. The information transmission process 100 may be performed by a terminal device and a network device. In other words, the information transmission process 100 may be performed by software or hardware installed in the terminal device and the network device.

The information transmission process 100 may include the following steps: S102 and S104.

S102: The terminal device multiplexes independently coded UCI onto a physical uplink shared channel PUSCH according to a target size to send the independently coded UCI.

In UCI, a hybrid automatic repeat request (HARQ) codebook, a channel state information (CSI) part I, a CSI part II, configured grant (CG) UCI, and the like are independently coded.

The target size is determined according to an actual size of the independently coded UCI.

By S102 performed by the terminal device, the method for transmitting uplink control information according to the first aspect of the present disclosure can be implemented.

S104: The network device receives the independently coded UCI.

The UCI is sent by multiplexing the independently coded UCI onto a physical uplink shared channel PUSCH according to a target size, and the target size is determined according to the actual size of the independently coded UCI.

By S104 performed by the network device, the method for transmitting uplink control information according to the third aspect of the present disclosure can be implemented.

Because the target size is determined according to the actual size of the independently coded UCI, a size of the independently coded UCI considered by the network device is the same as the target size. Therefore, understanding inconsistency between a base station and UE can be prevented, a decoding failure of the PUSCH can be prevented, and the reliability of the PUSCH and UCI decoding after UCI multiplexing can be effectively improved.

Figure 2:
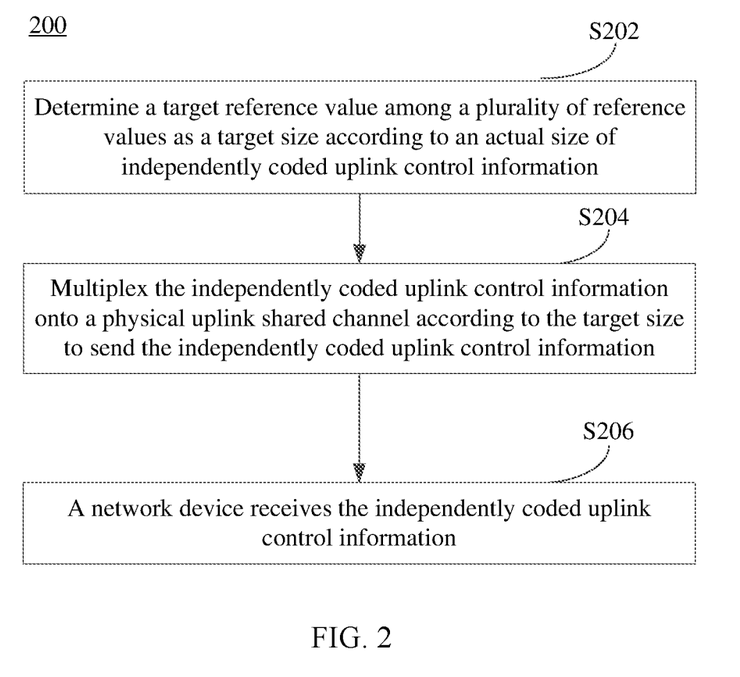
FIG. 2 is another schematic flow chart of an information transmission process including the method for transmitting uplink control information according to the first aspect and the third aspect of the present disclosure.

FIG. 2 is another schematic flow chart of an information transmission process including the method for transmitting uplink control information according to the first aspect and the third aspect of the present disclosure. The information transmission process 200 may be performed by a terminal device and a network device. In other words, the information transmission process 200 may be performed by software or hardware installed in the terminal device and the network device.

The information transmission process 200 may include the following steps: S202, S204, and S206.

S202: Determine a target reference value among a plurality of reference values as a target size according to an actual size of independently coded UCI.

The plurality of reference values may be configured by the network device or specified in a protocol. The target reference value is greater than or equal to the actual size of the independently coded UCI.

When UCI needs to be multiplexed on a PUSCH for transmission, a size of the independently coded UCI understood by UE (that is, the actual size of the independently coded UCI) is often different from that considered by the network device because of a previous error in decoding downlink control information (DCI) by the UE. It can be seen that an actual size S of the independently coded UCI must be less than a size s of the independently coded UCI considered by the network device.

Based on this, to enable the UE to send the independently coded UCI based on a size S' of the independently coded UCI considered by the network device, the target reference value should be greater than or equal to the actual size S of the independently coded UCI. In addition, based on this, the target reference value may be determined as the target size in subsequent steps, and the independently coded UCI may be multiplexed onto the PUSCH according to the target size to send the independently coded UCI, so that the network device and the UE can have the same understanding on the size of the independently coded UCI, that is, S'.

For example, the network device is configured with a plurality of reference values in advance, such as $S_0$, $S_1$, $S_2$, ..., Sn, where $S_0$ is equal to 0 and n is an integer greater than or equal to 1.

When the target reference value is greater than or equal to the actual size S of the independently coded UCI, that is, when S is greater than $S_i$ and is less than or equal to $S_{i+1}$, a target reference value $S_{i+1}$ in $S_0$, $S_1$, $S_2$, ..., $S_n$ is determined as the target size S', that is, S' is equal to $S_{i+1}$.

For example, reference values of a size of a multiplexed UCI's HARQ codebook configured by a base station are 4, 8, 12, and 16. When the UCI containing the HARQ codebook of UE1 meets a condition of multiplexing onto a CG PUSCH, the transmitted HARQ codebook is 11101, that is, the actual size S of the independently coded UCI is 5. Because 5 is greater than 4 and less than 8, a target reference value $S_{i+1}$ that is equal to 8 among a plurality of reference values configured by the network device is determined as the target size through the UE1, that is, the target size is determined as S' that is equal to 8 in this step.

S204: Multiplex the independently coded UCI onto a physical uplink shared channel PUSCH according to the target size to send the independently coded UCI.

The target size is determined according to the actual size of the independently coded UCI, and a size of the independently coded UCI considered by the network device is the same as the target size. Therefore, understanding inconsistency between a base station and UE can be prevented, a decoding failure of the PUSCH can be prevented, and the reliability of the PUSCH and UCI decoding after UCI multiplexing can be effectively improved.

The present disclosure shows the following implementations of step S204. Certainly, it should be understood that step S204 may also be implemented in other ways, which is not limited in the present disclosure.

In an implementation, step S204 may include: adjusting the size of the independently coded UCI to the target size; determining the number of target resource elements (RE) according to the target size; and coding, according to a first coding rate corresponding to the number of the target REs, the independently coded UCI adjusted to the target size, and multiplexing the independently coded UCI onto the PUSCH to send the independently coded UCI.

For example, the transmitted HARQ codebook in step S202 is 11101, that is, the actual size of the independently coded UCI is 5, and that the target size is determined to be 8 in step S202 is used as an example.

In step S204, the UE1 supplements bits of the HARQ codebook to 8 bits, that is, 11101000, determines the number of target REs required for carrying the 8 bits, and codes and multiplexes the HARQ codebook supplemented to 8 bits onto the PUSCH according to a first coding rate and mapping rule corresponding to the number of the target REs.

In another implementation, step S204 may include: determining the number of target resource elements REs according to the target size; determining a second coding rate according to the number of the target REs and the actual size of the independently coded UCI; and coding the independently coded UCI according to the second coding rate and multiplexing the independently coded UCI onto the PUSCH to send the independently coded UCI.

For example, the transmitted HARQ codebook in step S202 is 11101, that is, the actual size of the independently coded UCI is 5, and that the target size is determined to be 8 in step S202 is used as an example.

In this step, the UE1 supplements bits of the HARQ codebook to 8 bits, that is, 11101000, determines the number of the target REs for carrying the 8 bits, and determines the second coding rate according to the number of the target REs and the actual size 5 bits of the HARQ codebook; and coding the independently coded UCI according to the second coding rate and multiplexing the independently coded UCI onto the PUSCH to send the independently coded UCI.

By S202 and S204 performed by the terminal device, the method for transmitting uplink control information according to the first aspect of the present disclosure can be implemented.

S206: The network device receives the independently coded UCI.

By S206 performed by the network device, the method for transmitting uplink control information according to the third aspect of the present disclosure can be implemented.

Therefore, in this embodiment of the present disclosure, according to the actual size of the independently coded UCI, the target reference value among the plurality of reference values configured by the network device is determined as the target size, the independently coded UCI is multiplexed onto the physical uplink shared channel PUSCH according to the target size to send the independently coded UCI. Therefore, a terminal can send the independently coded UCI according to the reference value configured by the network device, and the size of the independently coded UCI considered by the network device can be the same as that understood by the UE, thereby preventing a decoding failure of the PUSCH and effectively improving the reliability of the PUSCH and UCI decoding after UCI multiplexing.

Figure 3:
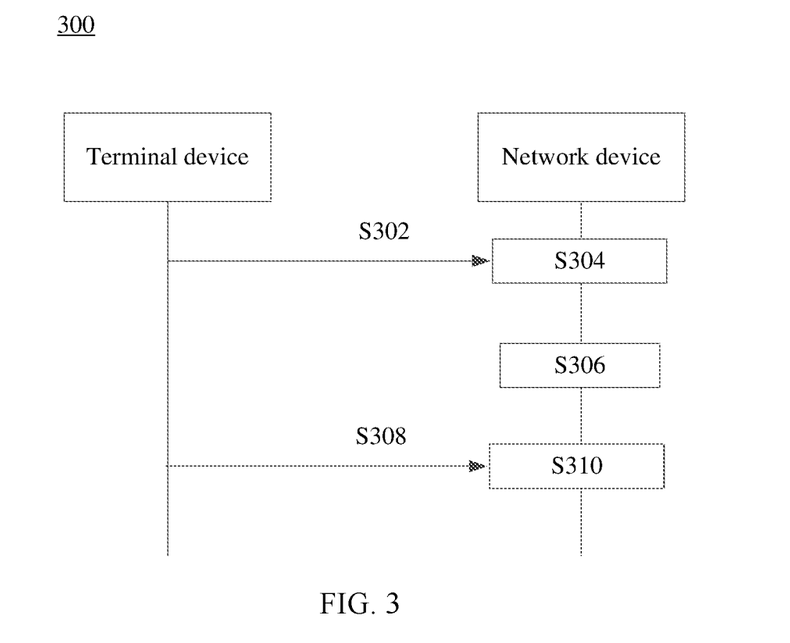
FIG. 3 is still another schematic flow chart of an information transmission process including the method for transmitting uplink control information according to the first aspect and the third aspect of the present disclosure.

FIG. 3 is still another schematic flow chart of an information transmission process including the method for transmitting uplink control information according to the first aspect and the third aspect of the present disclosure. The information transmission process 300 may be performed by a terminal device and a network device. In other words, the information transmission process 300 may be performed by software or hardware installed in the terminal device and the network device.

The information transmission process 300 may include the following steps: S302, S304, S306, S308, and S310.

S302: The terminal device sends target size information to the network device.

The target size information includes an actual size or a modulus of independently coded UCI.

S304: The network device receives the target size information sent by the terminal device.

The target size information includes the actual size or a modulus of the independently coded UCI.

S306: The network device adjusts, according to the target size information, a size of the independently coded UCI considered by the network device to the target size.

S308: The terminal device multiplexes the independently coded UCI onto a physical uplink shared channel PUSCH according to a target size to send the independently coded UCI.

S310: The network device receives the independently coded UCI.

By S302 and S308 performed by the terminal device, the method for transmitting uplink control information according to the first aspect of the present disclosure can be implemented.

By S304, S306, and S310 performed by the network device, the method for transmitting uplink control information according to the third aspect of the present disclosure can be implemented.

Therefore, in this embodiment of the present disclosure, the terminal device sends the target size information to the network device, and the network device adjusts the size of the independently coded UCI that it considers to the target size, which can ensure that the size of the independently coded UCI considered by the network device is the same as that understood by the UE, thereby preventing a decoding failure of the PUSCH and effectively improving the reliability of the PUSCH and UCI decoding after UCI multiplexing.

Figure 4:
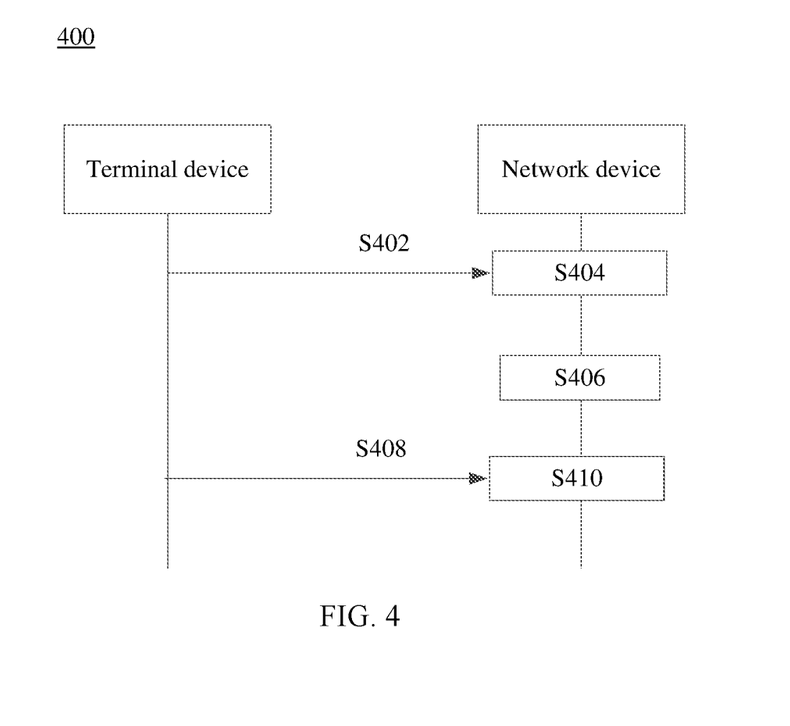
FIG. 4 is yet another schematic flow chart of an information transmission process including the method for transmitting uplink control information according to the first aspect and the third aspect of the present disclosure.

FIG. 4 is yet another schematic flow chart of an information transmission process including the method for transmitting uplink control information according to the first aspect and the third aspect of the present disclosure. The information transmission process 400 may be performed by a terminal device and a network device. In other words, the information transmission process 400 may be performed by software or hardware installed in the terminal device and the network device.

The information transmission process 400 may include the following steps: S402, S404, S406, S408, and S410.

S402: The terminal device sends target size information to the network device.

The target size information includes an actual size or a modulus of independently coded UCI.

In an implementation, the terminal device may send the actual size or modulus of the independently coded UCI through predetermined information in a PUSCH or a predetermined part in the independently coded UCI.

For example, the predetermined information in the PUSCH may be a demodulation reference signal (DM-RS), indicating a size S or mod(S, A) of independently coded UCI with ambiguity in the UCI, where A is a value specified in a protocol or a value configured in radio resource control (RRC).

When the network device performs DM-RS configuration on configured grant of UE1, two DM-RS sequences/ports are configured. When UCI of the UE1 containing a HARQ codebook meets the condition of multiplexing to a configured grant PUSCH and a size of HARQ codebook mod 2 is 0, the first DM-RS sequence/port is used by a CG PUSCH for transmission. Otherwise, the second DM-RS sequence is used for transmission.

For example, a size S or mod(S, A) of the independently coded UCI with ambiguity may also be indicated by a predetermined part of a fixed size in the independently coded UCI, where A is a value specified in a protocol or a value configured in RRC.

In an implementation, the independently coded UCI may include a plurality of sub-parts, each piece of sub-target size information includes a size or modulus of each sub-part, and the terminal device sends a plurality of pieces of sub-target size information.

5404: The network device receives the target size information sent by the terminal device.

The target size information includes the actual size or a modulus of the independently coded UCI.

Correspondingly, in an implementation, in the case that the terminal device sends the actual size or modulus of the independently coded UCI through the predetermined information in the PUSCH or the predetermined part in the independently coded UCI, the network device receives the actual size or modulus of the independently coded UCI through the predetermined information in the PUSCH or the predetermined part in the independently coded UCI.

Correspondingly, in an implementation, in the case that the terminal device sends a plurality of pieces of sub-target size information, the network device receives the plurality of pieces of sub-target size information sent by the terminal device.

S406: The network device adjusts, according to the target size information, a size of the independently coded UCI considered by the network device to the target size.

In the case that the target size information includes the actual size S of the independently coded UCI, the network device adjusts a size s of the independently coded UCI considered by the network device to the actual size S of the independently coded UCI, that is, s=S.

In the case that the target size information includes a modulus mod(S, A) of the independently coded UCI, the size s of the independently coded UCI considered by the network device is adjusted as follows: a value whose modulus is the same as the mod(S, A) of the independently coded UCI and less than or equal to the size s of the independently coded UCI considered by the network device.

This is because, when UCI needs to be multiplexed on the PUSCH for transmission, a size of the independently coded UCI understood by UE (that is, the actual size S of the independently coded UCI) is often different from s considered by the network device because of a previous error in decoding downlink control information (DCI) by the UE. It can be seen that an actual size S of the independently coded UCI must be less than a size s of the independently coded UCI considered by the network device.

Based on this, to adjust the size s of the independently coded UCI considered by the network device to be the same as the actual size S of the independently coded UCI understood by the UE, a value of s should be adjusted to be less than or equal to an initial value of s, and a modulus of s is the same as that of S, so that s is equal to S.

For example, based on the description in step S402, if the CG PUSCH uses the first DM-RS sequence/port for transmission, in this step, the network device recognizes a value of a size of HARQ codebook mod 2 is 0. If the network device considers a size s of the HARQ codebook as 5, in this step, s is adjusted as follows: a value whose modulus mod 2 is 0 and less than or equal to s, that is, s is adjusted to 4.

In another example, a configured grant PUSCH transmitted on an unlicensed frequency band will carry the CG UCI. The CG UCI includes a size of a HARQ codebook to indicate a total downlink allocation index (DAI) of a carried HARQ codebook, that is, a value of a size of HARQ codebook mod 4. When the transmitted HARQ codebook is 11101 and its size is 5, a total DAI of the CG UCI is indicated by 1. If a base station considers the size of the HARQ codebook as 6, it will automatically adjust, when receiving the total DAI indicated as 1, the size of the HARQ codebook to 5 for decoding in this step.

S408: The terminal device multiplexes independently coded UCI onto a physical uplink shared channel PUSCH according to a target size to send the independently coded UCI.

In an implementation, the independently coded UCI is at least one of the HARQ codebook, a CSI part I of a single cell, a CSI part II, or CG UCI; or the independently coded UCI is obtained by jointly coding at least one of the HARQ codebook, a CSI part I, a CSI part II, or CG UCI.

In an implementation, the PUSCH which the UCI is multiplexed onto is a dynamically scheduled PUSCH or a configured scheduled PUSCH.

S410: The network device receives the independently coded UCI.

By S402 and S408 performed by the terminal device, the method for transmitting uplink control information according to the first aspect of the present disclosure can be implemented.

By S404, S406, and S410 performed by the network device, the method for transmitting uplink control information according to the third aspect of the present disclosure can be implemented.

Therefore, in this embodiment of the present disclosure, the network device sends the target size information to the network device and the network device adjusts the size of the independently coded UCI that it considers to the target size, which can ensure that the size of the independently coded UCI considered by the network device is the same as that understood by the UE, thereby preventing a decoding failure of the PUSCH and effectively improving the reliability of the PUSCH and UCI decoding after UCI multiplexing.

Figure 5:
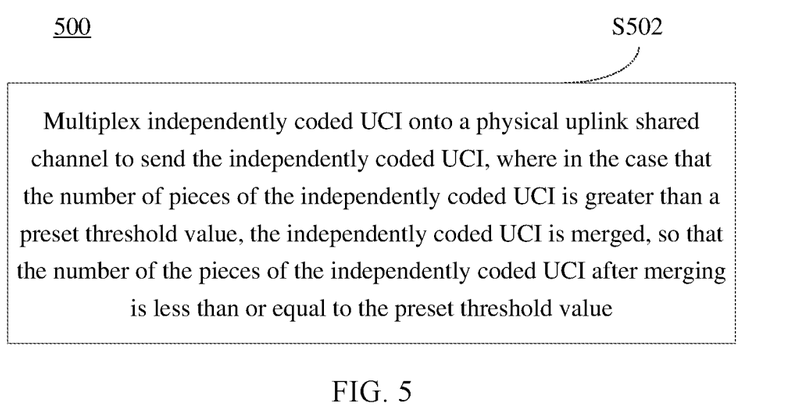
FIG. 5 is a schematic flow chart of an embodiment of a method for transmitting uplink control information according to a second aspect of the present disclosure.

FIG. 5 is a schematic flow chart of an embodiment of a method for transmitting uplink control information according to a second aspect of the present disclosure. The method 500 for transmitting uplink control information may be performed by a terminal device. In other words, the method 500 for transmitting uplink control information may be performed by software or hardware installed in the terminal device.

The method 500 for transmitting uplink control information includes the following step.

S502: Multiplex independently coded UCI onto a physical uplink shared channel PUSCH to send the independently coded UCI.

In the case that the number of pieces of independently coded UCI is greater than a preset threshold value, the independently coded UCI is merged, so that the number of pieces of independently coded UCI after merging is less than or equal to the preset threshold value.

For example, it is stipulated in a protocol that the preset threshold value of the independently coded UCI for being multiplexed onto the PUSCH is 3. When UCI to be multiplexed onto a CG PUSCH only contains less than two of a HARQ codebook, a CSI part I, and a CSI part II (for example, the HARQ codebook only), parts contained by CG UCI and the UCI are independently coded.

When the UCI to be multiplexed onto the CG PUSCH contains a HARQ codebook, a CSI part I, and a CSI part II, a payload of the CG UCI and the HARQ codebook are cascaded and jointly coded, so that the number of pieces of the independently coded UCI for being multiplexed is still 3, which is not greater than the threshold value.

Therefore, in this embodiment of the present disclosure, normal transmission of the UCI can be ensured in the case that there are a great number of pieces of the independently coded UCI.

Figure 6:
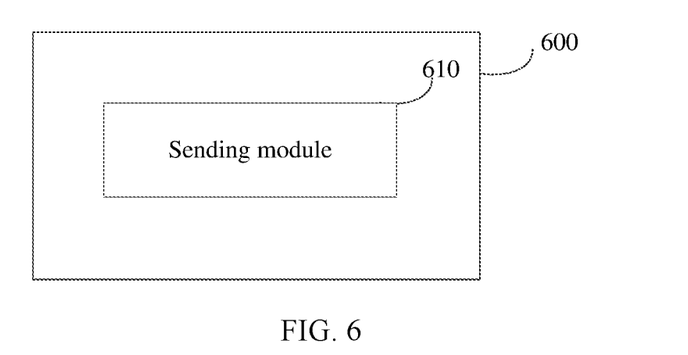
FIG. 6 is a schematic structural diagram of an embodiment of a terminal device according to a fourth aspect of the present disclosure.

FIG. 6 is a schematic structural diagram of an embodiment of a terminal device according to a fourth aspect of the present disclosure. As shown in FIG. 6, a terminal device 600 includes a sending module 610.

The sending module 610 is configured to multiplex independently coded uplink control information UCI onto a physical uplink shared channel PUSCH according to a target size to send the independently coded UCI, where the target size is determined according to an actual size of the independently coded UCI.

In an implementation, before sending the independently coded UCI according to the target size, the sending module 610 is further configured to determine, according to the actual size of the independently coded UCI, a target reference value among a plurality of reference values configured by a network device as the target size, where the target reference value is greater than or equal to the actual size of the independently coded UCI.

In an implementation, the sending module 610 is configured to adjust a size of the independently coded UCI to the target size; determine the number of target resource elements REs according to the target size; and code and multiplex, according to a first coding rate corresponding to the number of the target REs, the independently coded UCI adjusted to the target size onto the PUSCH to send the independently coded UCI.

In an implementation, the sending module 610 is configured to determine the number of target resource elements REs according to the target size; determine a second coding rate according to the number of the target REs and the actual size of the independently coded UCI; and code and multiplex, according to the second coding rate, the independently coded UCI onto the PUSCH to send the independently coded UCI.

In an implementation, before sending the independently coded UCI, the sending module 610 further sends target size information to the network device, where the target size information includes the actual size or a modulus of the independently coded UCI.

In an implementation, the sending module 610 is configured to send the actual size or modulus of the independently coded UCI to the network device through predetermined information in the PUSCH or a predetermined part in the independently coded UCI.

In an implementation, the sending module 610 is configured to send a plurality of pieces of sub-target size information to the network device. The independently coded UCI includes a plurality of sub-parts, and each piece of the sub-target size information includes an actual size or a modulus of each of the sub-parts.

In an implementation, the sending module 610 is configured to merge, in the case that the number of pieces of the independently coded UCI is greater than a preset threshold value, the independently coded UCI before sending the independently coded UCI, so that the number of pieces of the independently coded UCI after merging is less than or equal to the preset threshold value.

In an implementation, the independently coded UCI is at least one of a HARQ codebook, a CSI part I, a CSI part II, or CG UCI; or the independently coded UCI is obtained by jointly coding at least one of a HARQ codebook, a CSI part I, a CSI part II, or CG UCI.

In an implementation, the PUSCH is a dynamically scheduled PUSCH or a configured scheduled PUSCH.

For the terminal device 600 according to this embodiment of the present disclosure, please refer to each step performed by the terminal device in the information transmission processes 100-400 corresponding to the present disclosure, and each unit/module in the terminal device 600 and other operations and/or functions mentioned above are used to implement corresponding steps in the information transmission processes 100-400, and can achieve the same or equivalent technical effects. Therefore, for brevity, details are not described herein again.

Figure 7:
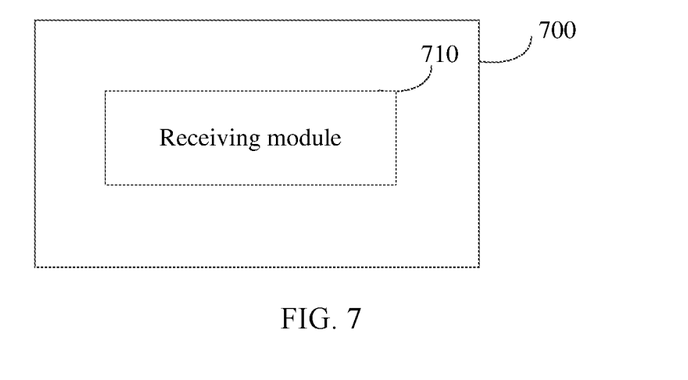
FIG. 7 is a schematic structural diagram of an embodiment of a network device according to a sixth aspect of the present disclosure.

FIG. 7 is a schematic structural diagram of an embodiment of a network device according to a sixth aspect of the present disclosure. As shown in FIG. 7, a network device 700 includes a receiving module 710.

The receiving module 710 is configured to receive independently coded UCI. The UCI is sent by multiplexing the independently coded UCI onto a physical uplink shared channel PUSCH according to a target size, and the target size is determined according to an actual size of the independently coded UCI.

In an implementation, the receiving module 710 is configured to receive, before receiving the independently coded UCI, target size information sent by the terminal device, where the target size information includes the actual size or a modulus of the independently coded UCI; and adjust, according to the target size information, a size of the independently coded UCI considered by the network device to the target size.

In an implementation, the receiving module 710 is configured to receive the actual size or modulus of the independently coded UCI through predetermined information in the PUSCH or a predetermined part of the independently coded UCI.

In an implementation, the receiving module 710 is configured to adjust the size of the independently coded UCI considered by the network device as follows: a value whose modulus is the same as that of the independently coded UCI and less than or equal to the size of the independently coded UCI considered by the network device.

In an implementation, the receiving module 710 is configured to receive a plurality of pieces of sub-target size information sent by the terminal device. The independently coded UCI includes a plurality of sub-parts, and each piece of the sub-target size information includes a size or a modulus of each of the sub-parts.

In an implementation, the independently coded UCI is at least one of a HARQ codebook, a CSI part I, a CSI part II, or CG UCI; or the independently coded UCI is obtained by jointly coding at least one of a HARQ codebook, a CSI part I, a CSI part II, or CG UCI.

In an implementation, the PUSCH is a dynamically scheduled PUSCH or a configured scheduled PUSCH.

For the network device 700 according to this embodiment of the present disclosure, please refer to each step performed by a network device in the information transmission processes 100-400 corresponding to the present disclosure, and each unit/module in the network device 700 and other operations and/or functions mentioned above are used to implement corresponding steps in the information transmission processes 100-400, and can achieve the same or equivalent technical effects. Therefore, for brevity, details are not described herein again.

Figure 8:
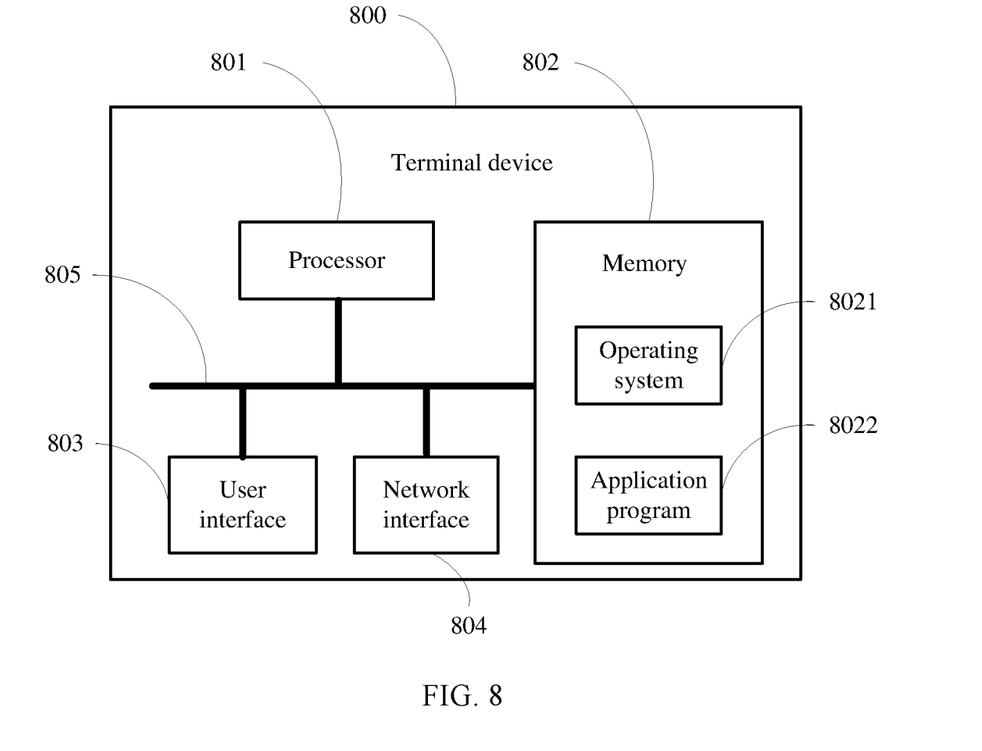
FIG. 8 is a schematic structural diagram of an embodiment of a terminal device according to a seventh aspect of the present disclosure.

FIG. 8 is a schematic structural diagram of an embodiment of a terminal device according to a seventh aspect of the present disclosure. As shown in FIG. 8, the terminal device 800 includes: at least one processor 801, a memory 802, at least one network interface 804, and a user interface 803. All components of the terminal device 800 are coupled together by using a bus system 805. It can be understood that the bus system 805 is configured to implement connection and communication between these components. In addition to a data bus, the bus system 805 further includes a power bus, a control bus, and a status signal bus. However, for clear description, various buses are marked as the bus system 805 in FIG. 8.

The user interface 803 may include a display, a keyboard, a clicking device (for example, a mouse or a trackball), a touch panel, a touchscreen, or the like.

It can be understood that the memory 802 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory (DRRAM). The memory 802 in the system and the method that are described in the embodiments of the present disclosure is intended to include but is not limited to these and any other suitable types of memories.

In some implementations, the memory 802 stores the following elements: an executable module or a data structure, a subset thereof, or an extended set thereof: an operating system 8021 and an application program 8022.

The operating system 8021 includes various system programs, such as a framework layer, a core library layer, a driver layer, and the like, and is configured to implement various basic services and process hardware-based tasks. The application program 8022 includes various applications, for example, a media player, a browser, and the like, to implement various application services. A program implementing the method in the embodiments of the present disclosure may be included in the application program 8022.

In this embodiment of the present disclosure, the terminal device 800 further includes: a computer program stored in the memory 802 and executable on the processor 801, where when the computer program is executed by the processor 801, the steps of the foregoing information transmission processes 100-400 performed by the terminal device or the steps of the foregoing method for transmitting uplink control information 500 are implemented.

The method disclosed in the foregoing embodiments of the present disclosure may be applied to the processor 801 or implemented by the processor 801. The processor 801 may be an integrated circuit chip having a signal processing capability. During implementation, each step of the foregoing method may be completed by using an integrated logic circuit of hardware or an instruction in a form of software in the processor 801. The processor 801 may be a general purpose processor, a digital signal processor (DSP), an application specific integrated circuit (ASIC), a field programmable gate array (FPGA), another programmable logic device, a discrete gate, a transistor logic device, or a discrete hardware component. The processor may implement or perform the methods, the steps, and logical block diagrams that are disclosed in the embodiments of the present disclosure. The general purpose processor may be a microprocessor or may be any conventional processor or the like. Steps of the methods disclosed with reference to the embodiments of the present disclosure may be directly performed and accomplished through a hardware decoding processor, or may be performed and accomplished by using a combination of hardware and software modules in the decoding processor. The software module may be located in a mature non-transitory computer-readable storage medium in this field such as a random access memory, a flash memory, a read-only memory, a programmable read-only memory, an electrically erasable programmable memory, a register, or the like. The non-transitory computer-readable storage medium is located in the memory 802, and the processor 801 reads information from the memory 802 and completes the steps of the foregoing method in combination with its hardware. For example, the non-transitory computer-readable storage medium stores a computer program, where when the computer program is executed by the processor 801, the steps performed by the terminal device in the foregoing information transmission processes 100-400 or the steps in the foregoing method for transmitting uplink control information 500 are implemented.

It can be understood that these embodiments described in the embodiments of the present disclosure may be implemented by hardware, software, firmware, middleware, microcode, or a combination thereof. For implementation with hardware, a processing unit can be implemented in one or more application specific integrated circuits (ASIC), digital signal processors (DSP), digital signal processing devices (DSPD), programmable logic devices (PLD), field-programmable gate arrays (FPGA), general processors, controllers, micro-controllers, microprocessors, and another electronic unit for implementing the functions of the present application, or their combinations.

For software implementation, technologies described in the embodiments of the present disclosure may be implemented through modules (for example, procedures, functions, or the like) that implement the functions in the embodiments of the present disclosure. A software code may be stored in a memory and executed by a processor. The memory may be implemented in the processor or outside the processor.

The terminal device 800 can implement the steps performed by the terminal device in the foregoing information transmission processes 100-400, and can achieve the same or equivalent technical effects. To avoid repetition, details are not described herein again.

Figure 9:
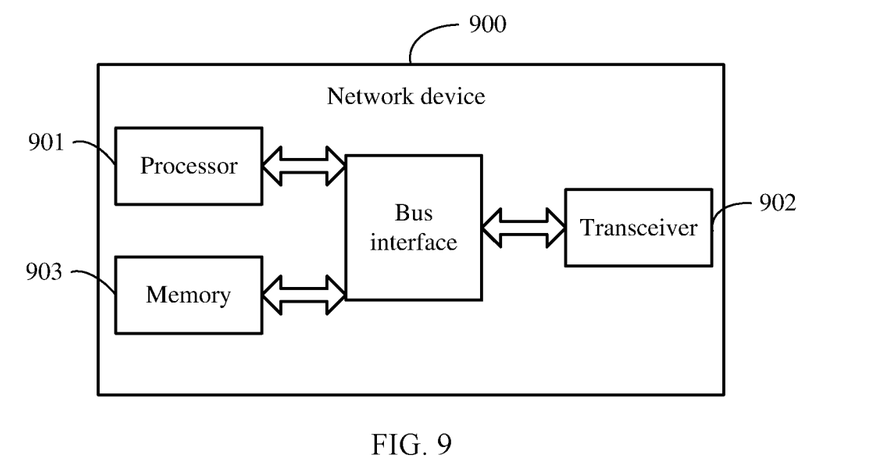
FIG. 9 is a schematic structural diagram of an embodiment of a network device according to an eighth aspect of the present disclosure.

FIG. 9 is a schematic structural diagram of an embodiment of a network device according to an eighth aspect of the present disclosure. Each step performed by the network device in the foregoing information transmission processes 100-400 may be implemented, and the same effect can be achieved. As shown in FIG. 9, a network device 900 includes a processor 901, a transceiver 902, a memory 903, and a bus interface. In this embodiment of the present disclosure, the network device 900 may further include: a computer program stored in the memory 903 and executable on the processor 901. When the computer program is executed by the processor 901, each step performed by the network device in the foregoing information transmission processes 100-400 can be implemented.

In FIG. 9, a bus architecture may include any number of interconnected buses and bridges. Various circuits of one or more processors represented by the processor 901 and a memory represented by the memory 903 are interconnected. The bus architecture may further link other various circuits such as a peripheral device, a voltage stabilizer, and a power management circuit. These are well known in the art, and therefore are not described in this specification. The bus interface provides an interface. The transceiver 902 may be a plurality of elements, in other words, include a transmitter and a receiver, and provide a unit for communicating with other various apparatuses on a transmission medium.

The processor 901 is responsible for managing the bus architecture and common processing, and the memory 903 may store data used when the processor 901 performs an operation.

Figure 10:
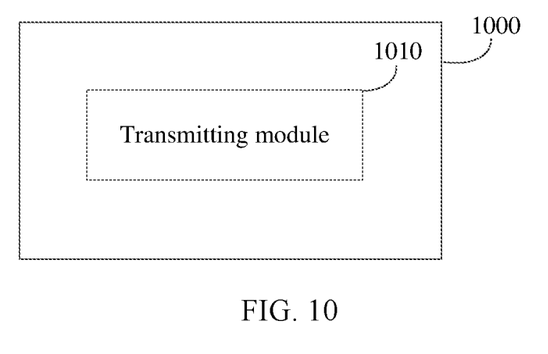
FIG. 10 is a schematic structural diagram of an embodiment of a terminal device according to a fifth aspect of the present disclosure.

FIG. 10 is a schematic structural diagram of an embodiment of a terminal device according to a fifth aspect of the present disclosure. As shown in FIG. 10, a terminal device 1000 includes a transmitting module 1010.

The transmitting module 1010 is configured to multiplex independently coded UCI onto a physical uplink shared channel PUSCH to send the independently coded UCI. In the case that the number of pieces of the independently coded UCI is greater than a preset threshold value, the independently coded UCI is merged, so that the number of the pieces of the independently coded UCI after merging is less than or equal to the preset threshold value.

The terminal device 1000 can implement each step in the foregoing method 500 for transmitting uplink control information, and achieve a corresponding effect, which is not described herein again.

An embodiment of the present disclosure further provides a non-transitory computer-readable storage medium, where the non-transitory computer-readable storage medium stores a computer program. When the computer program is executed by a processor, each step of the method for transmitting uplink control information performed by a terminal device or each step of the method for transmitting uplink control information performed by a network device can be implemented, and the same technical effect can be achieved. To avoid repetition, details are not described herein again. For example, the non-transitory computer-readable storage medium includes, such as a read-only memory (ROM), a random access memory (RAM), a magnetic disk, an optical disc, or the like.

The foregoing describes the aspects of the present disclosure with reference to flowcharts and/or block diagrams of the method, the apparatus (system), and the computer program product according to the embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

It should be noted that in this specification, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are merely examples instead of restrictions. With enlightenment because of the present disclosure, a person of ordinary skills in the art may make many forms without departing from the aim of the present disclosure and the protection scope of the claims, all of which fall within the protection of the present disclosure.

What is claimed is:

1. A method for transmitting uplink control information, wherein the method is performed by a terminal device and comprises:

multiplexing independently coded uplink control information (UCI) onto a physical uplink shared channel (PUSCH) according to a target size to send the independently coded UCI, wherein the target size is determined according to an actual size of the independently coded UCI;

wherein before the multiplexing independently coded UCI onto a PUSCH according to a target size to send the independently coded UCI, the method further comprises:

sending target size information to a network device, wherein the target size information includes the actual size or a modulus of the independently coded UCI; or in a case that number of pieces of the independently coded UCI is greater than a preset threshold value, merging the independently coded UCI, so that the number of the pieces of the independently coded UCI after merging is less than or equal to the preset threshold value.

2. The method according to claim 1, wherein before the multiplexing independently coded uplink control information (UCI) onto a physical uplink shared channel (PUSCH) according to a target size to send the independently coded UCI, the method further comprises:

determining a target reference value among a plurality of reference values as the target size according to the actual size of the independently coded UCI, wherein the target reference value is greater than or equal to the actual size of the independently coded UCI.

3. The method according to claim 1, wherein the multiplexing independently coded uplink control information (UCI) onto a physical uplink shared channel (PUSCH) according to a target size to send the independently coded UCI comprises:

adjusting a size of the independently coded UCI to the target size;

determining number of target resource elements (REs) according to the target size; and coding, according to a first coding rate corresponding to the number of the target REs, the independently coded UCI adjusted to the target size, and multiplexing the independently coded UCI onto the PUSCH to send the independently coded UCI.

4. The method according to claim 1, wherein the multiplexing independently coded uplink control information (UCI) onto a physical uplink shared channel (PUSCH) according to a target size to send the independently coded UCI comprises:

determining number of target resource elements (REs) according to the target size;

determining a second coding rate according to the number of the target REs and the actual size of the independently coded UCI; and coding the independently coded UCI according to the second coding rate and multiplexing the independently coded UCI onto the PUSCH to send the independently coded UCI.

5. The method according to claim 1, wherein the sending target size information to a network device comprises:

sending the actual size or modulus of the independently coded UCI to the network device through predetermined information in the PUSCH or a predetermined part in the independently coded UCI.

6. The method according to claim 1, wherein the sending target size information to a network device comprises:

sending a plurality of pieces of sub-target size information to the network device, wherein the independently coded UCI comprises a plurality of sub-parts, and each piece of the sub-target size information includes an actual size or a modulus of each of the sub-parts.

7. The method according to claim 1, wherein the independently coded UCI is at least one of a hybrid automatic repeat request (HARQ) codebook, a channel state information (CSI) part I, a CSI part II, or configured grant (CG) UCI; or the independently coded UCI is obtained by jointly coding at least one of a HARQ codebook, a CSI part I, a CSI part II, or CG UCI.

8. The method according to claim 1, wherein the PUSCH which the UCI is multiplexed onto is a dynamically scheduled PUSCH or a configured scheduled PUSCH.

9. A terminal device, comprising: a memory, a processor, and a computer program stored in the memory and executable on the processor, wherein the computer program, when executed by the processor, causes the terminal device to perform:

multiplexing independently coded uplink control information (UCI) onto a physical uplink shared channel (PUSCH) according to a target size to send the independently coded UCI, wherein the target size is determined according to an actual size of the independently coded UCI;

wherein the computer program, when executed by the processor, causes the terminal device to further perform:

sending target size information to a network device, wherein the target size information includes the actual size or a modulus of the independently coded UCI; or in a case that number of pieces of the independently coded UCI is greater than a preset threshold value, merging the independently coded UCI, so that the number of the pieces of the independently coded UCI after merging is less than or equal to the preset threshold value.

10. The terminal device according to claim 9, wherein the computer program, when executed by the processor, causes the terminal device to further perform:

determining a target reference value among a plurality of reference values as the target size according to the actual size of the independently coded UCI, wherein the target reference value is greater than or equal to the actual size of the independently coded UCI.

11. The terminal device according to claim 9, wherein the computer program, when executed by the processor, causes the terminal device to perform:

adjusting a size of the independently coded UCI to the target size;

determining number of target resource elements (REs) according to the target size; and coding, according to a first coding rate corresponding to the number of the target REs, the independently coded UCI adjusted to the target size, and multiplexing the independently coded UCI onto the PUSCH to send the independently coded UCI.

12. The terminal device according to claim 9, wherein the computer program, when executed by the processor, causes the terminal device to perform:

determining number of target resource elements (REs) according to the target size;

determining a second coding rate according to the number of the target REs and the actual size of the independently coded UCI; and coding the independently coded UCI according to the second coding rate and multiplexing the independently coded UCI onto the PUSCH to send the independently coded UCI.

13. The terminal device according to claim 9, wherein the computer program, when executed by the processor, causes the terminal device to perform:

sending the actual size or modulus of the independently coded UCI to the network device through predetermined information in the PUSCH or a predetermined part in the independently coded UCI.

14. The terminal device according to claim 9, wherein the computer program, when executed by the processor, causes the terminal device to perform:

sending a plurality of pieces of sub-target size information to the network device, wherein the independently coded UCI comprises a plurality of sub-parts, and each piece of the sub-target size information includes an actual size or a modulus of each of the sub-parts.

15. A network device, comprising: a memory, a processor, and a computer program stored in the memory and executable on the processor, wherein the computer program, when executed by the processor, causes the network device to perform:

receiving independently coded uplink control information (UCI), wherein the UCI is sent by multiplexing the independently coded UCI onto a physical uplink shared channel (PUSCH) according to a target size, and the target size is determined according to an actual size of the independently coded UCI;

wherein the computer program, when executed by the processor, causes the network device to further perform:

receiving target size information sent by a terminal device, wherein the target size information includes the actual size or a modulus of the independently coded UCI; and adjusting, according to the target size information, a size of the independently coded UCI considered by the network device to the target size.

16. The network device according to claim 15, wherein the computer program, when executed by the processor, causes the network device to perform:

receiving the actual size or modulus of the independently coded UCI through predetermined information in the PUSCH or a predetermined part in the independently coded UCI.

17. The network device according to claim 15, wherein the computer program, when executed by the processor, causes the network device to perform:

adjusting the size of the independently coded UCI considered by the network device as follows: a value whose modulus is same as that of the independently coded UCI and less than or equal to the size of the independently coded UCI considered by the network device.

18. The network device according to claim 15, wherein the computer program, when executed by the processor, causes the network device to perform:

receiving a plurality of pieces of sub-target size information sent by the terminal device, wherein the independently coded UCI comprises a plurality of sub-parts, and each piece of the sub-target size information includes an actual size or a modulus of each of the sub-parts.

19. The network device according to claim 15, wherein the independently coded UCI is at least one of a hybrid automatic repeat request (HARQ) codebook, a channel state information (CSI) part I, a CSI part II, or channel state information (CG) UCI; or the independently coded UCI is obtained by jointly coding at least one of a HARQ codebook, a CSI part I, a CSI part II, or CG UCI.

20. The network device according to claim 15, wherein the PUSCH which the UCI is multiplexed onto is a dynamically scheduled PUSCH or a configured scheduled PUSCH.

* * * * *